United States Patent

Rynbrandt

[15] 3,673,197
[45] June 27, 1972

[54] EXO-DIBICYCLOALKANE CARBOXAMIDES

[72] Inventor: Ronald H. Rynbrandt, Portage, Mich.
[73] Assignee: The Upjohn Company, Kalamazoo, Mich.
[22] Filed: Jan. 14, 1971
[21] Appl. No.: 106,602

[52] U.S. Cl. .............260/295 AM, 260/557 B, 260/295 D, 260/295 K, 424/320, 424/263
[51] Int. Cl. ............................C07d 31/44, C07c 103/19
[58] Field of Search .........260/557 B, 295 AM, 295 R, 295 D

[56] References Cited

UNITED STATES PATENTS 2,681,931   6/1954   Jenkins..............................260/557 B Primary Examiner—Henry R. Jiles
Assistant Examiner—Robert T. Bond
Attorney—Hans L. Berneis and John Kekich

[57] ABSTRACT

An exo-dibicycloalkanecarboxamide of the structural formula II:

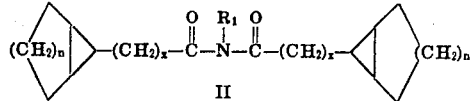

wherein $n$ has the value of 1 to 3, inclusive; wherein $x$ is zero or 1; and wherein $R_1$ is selected from the group consisting of hydrogen, alkyl of one to six carbon atoms, inclusive, 2-pyridyl, phenyl, and substituted phenyl in which the substituent is alkyl of one to three carbon atoms, inclusive, alkoxy of one to three carbon atoms, inclusive, halogen, nitro or trifluoromethyl, is produced by reacting 2 molar equivalents of a formyl or acetyl exo-bicycloalkanecarbohalide of the formula I

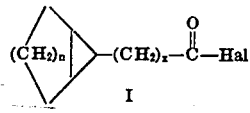

wherein $n$ and $x$ are defined as above, and Hal is chlorine or bromine, with about 1 molar equivalent of an amine $H_2N-R_1$, in which $R_1$ is defined as above. Compounds II have antidiabetic activity and can be used in mammals to treat hyperglycemia.

4 Claims, No Drawings

EXO-DIBICYCLOALKANE CARBOXAMIDES

BACKGROUND OF THE INVENTION

Field of the Invention

The present invention is concerned with new organic compounds and more particularly with novel exo-dibicyclo-alkanecarboxamides II and the process of production therefor.

The novel compounds II and the process of production therefor can be illustratively represented as follows:

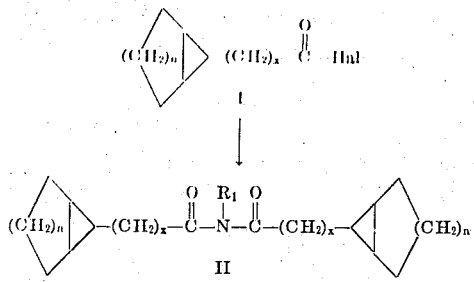

wherein Hal is a halogen selected from the group consisting of chlorine and bromine; wherein $n$ has the value of 1 to 3, inclusive, wherein $x$ is zero or one; and wherein $R_1$ is selected from the group consisting of hydrogen, alkyl of one to six carbon atoms, inclusive, alkoxy of one to three carbon atoms, inclusive, halogen, nitro or trifluoromethyl.

The process of the present invention comprises: treating a halide of formula I with an amine $H_2NR_1$ in solution to obtain the amide of formula II.

PREFERRED EMBODIMENT OF THE INVENTION

The formulae II herein shown are depicted in the exo configuration, i.e. the chain

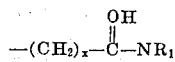

is directed away from the bicycloalkane group. The endo compounds are depicted with the chain

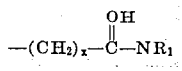

directed toward the bicycloalkane group. As the endo compounds are not orally active antidiabetics, they are not claimed.

The moiety:

can be cyclopentyl, cyclohexyl, or cycloheptyl, depending on whether $n$ is 1, 2, or 3.

The group $R_1$ refers to: alkyl groups (1-6 carbon atoms, inclusive) e.g. propyl, isopropyl, butyl, isobutyl, t-butyl, pentyl, isopentyl, t-pentyl, and hexyl, as well as methyl, ethyl, and the like.

The substituted phenyl groups also include o-, m-, p-tolyl; o-, m-, p-ethylphenyl, and propyl and isopropyl substituted phenyls, with the alkyls in o-, m-, and p-positions. Included also are phenyls substituted with fluorine, chlorine, bromine, iodine, $-NO_2$, and $-CF_3$, methoxy, ethoxy, propoxy, and isopropoxy in positions ortho, meta, or para, with respect to the attachment of the phenyl group to the N-atom in Compound II.

The compounds of the present invention are useful oral antidiabetic agents. In the past diabetes has been alleviated primarily by the use of insulin. Unfortunately, however, insulin cannot be given orally. Thus, the diabetics before the advent of sulfonylurea therapy for the treatment of diabetes were faced with a lifetime of insulin injections necessary for the maintenance of bodily health. The compounds of the present invention thus provide a means for the relief of diabetes without the necessity of injections. The novel compounds II are not only capable of reducing blood sugar to a safe level for a considerable period of time but, in addition, also bring about satisfactory blood-sugar reduction at low dosage levels.

For example, for tolbutamide the lowest doses with consistent hypoglycemic activity in the glucose-primed, fasted, intact rat is about 25 mg./kg., whereas N-(2-pyridyl)exo-dibicyclo[3.1.0.]hexane-6-carboxamide exhibits the same activity at 6.25 mg./kg.

All blood sugar determinations were made according to the following procedure:

Glucose-primed, fasted (18-24 hrs.), intact male rats are the test animal. The test compound is administered orally at a dosage of 100 mg./kg. or less in 0.5 cc. sterile vehicle (6 rats/group). Immediately following administration of the test material, the animals are injected subcutaneously with 125 mg. of glucose in 1 ml. 0.9 percent saline. Two hours later the rats are bled, via the vena cava, while under Cyclopal anesthesia, and blood sugars were determined. A significant depression of blood sugar from that of controls indicates activity.

For such oral administration the active compounds can be administered in liquid or solid dosage forms. Solid forms include capsules, tablets, powders, pills, and the like, and liquid forms include suitably flavored aqueous suspensions and solutions (depending on concentration desired), and flavored oil suspensions and solutions wherein edible oils, e.g., corn oil, cottonseed oil, coconut oil, peanut oil, sesame oil, or mixture of these and the like can be employed.

For preparing compositions such as tablets and other compressed formulations, the composition can include any compatible and edible tableting material used in pharmaceutical practice, e.g., corn starch, lactose, stearic acid, magnesium stearate, talc, methyl cellulose, and the like.

Similarly, the compounds of the present invention can be mixed with suitable adjuvants for the preparation of resorbable hard gelatin or soft gelatin capsules utilizing conventional pharmaceutical practices.

The following illustrative compositions are within the scope of the present invention:

1. Hard gelatin capsules —10,000 two-piece hard gelatin capsules for oral use, each containing 100 milligrams of N-(2-pyridyl)-exo-dibicyclo[3.1.0.]hexane-6-car-boxamide are prepared from the following amounts and types of materials:

| | | |
|---|---|---|
| N-(2-pyridyl)-exo-dibicyclo[3.1.0.]hexane-6-carboxamide | 1000 | gm. |
| Corn Starch | 1616 | gm. |
| Mineral oil, U. S. P. | 129.6 | gm. |
| Magnesium stearate, powder | 162 | gm. |
| Talc, U. S. P. | 162 | gm. |

The finely powdered N-(2-pyridyl)-exo-bicyclo[3.1.0.]-hexane-6-carboxamide is mixed thoroughly with the rest of the ingredients and then capsulated.

2. Soft elastic capsules-One piece soft elastic capsules for oral use, each containing 100 milligrams of N-(2-pyridyl)exo-dibicyclo[3.1.0.]hexane-6-carboxylate are prepared in the usual manner by first dispersing the active ingredient in sufficient corn oil to render the material capsulatable.)

3. Oil suspension-An oil suspension for oral use containing in each 5 milliliters 200 milligrams of N-(2-pyridyl)-exo-dibicyclo[3.1.0.]hexane-6-carboxamide is prepared from the following types and amounts of materials:

| | | |
|---|---|---|
| Sweetening agent | 3.5 | gm. |
| N-(2-pyridyl)-exo-dibicyclo[3.1.0.]-hexane-6-carboxamide | 400 | gm. |
| Preservative | 20 | gm. |
| Antioxidant | 1 | gm. |
| Flavoring | 25 | ml. |

Aluminum monostearate-corn oil gel q. s. to 10,000 ml.

4. Tablet-10,000 oral tablets each containing 250 milligrams of N-(2-pyridyl)-exo-dibicyclo[3.1.0.]hexane-6-carboxamide are prepared from the following types and amounts of materials:

| | |
|---|---|
| N-(2-pyridyl)-exo-dibicyclo[3.1.0] hexane 6-carboxamide | 2500 gm. |
| Dicalcium phosphate | 3050 gm. |
| Methylcellulose, U. S. P. (15 cps.) | 65 gm. |
| Talc, bolted | 450 gm. |
| Calcium stearate, fine powder | 35 gm. |

The ingredients are mixed in a conventional manner and compressed into tablets, each containing 250 mg. of active ingredient.

5. Syrup-A sugar-free syrup for oral use containing in each 5 milliliters 250 milligrams N-(2-pyridyl)exo-dibicyclo[3.1.0.]hexane-6-carboxamide is prepared from the following types and amounts of materials:

| | |
|---|---|
| N-(2-pyridyl)-exo-dibicyclo[3.1.0.] hexane-6-carboxamide | 500 gm. |
| Methylparaben, U. S. P. | 3 gm. |
| Sorbic acid | 3 gm. |
| Sweetening agent | 18 gm. |
| Flavoring | 3 ml. |
| Glycerin | 1500 ml. |
| Deionized water q. s. to 10,000 ml. | |

A dose of 1 teaspoonful (5 ml.) to 1 tablespoonful (15 ml.) will give the patient 250 to 750 mg of N-(2-pyridyl)-exo-dibicyclo[3.1.0.]hexane-6-carboxamide.

The dosage of the novel compounds II of the present invention for the treatment of diabetes depends on the age, weight, and condition of the patient being treated. Generally speaking for adult oral administration the preferred unit dosage is 50 to 1,000 mg. of active compounds with a suitable pharmaceutical diluent and/or lubricant. One or two unit dosages are given one to four times a day. A total daily dose of from 50 to 4,000 mg given singly, or preferably in divided doses, embraces the effective range for the treatment of diabetes.

In addition to the foregoing principal active ingredients, the present compositions can also include, as supplementary active ingredients, other blood sugar lowering compounds, such as tolbutamide, chlorpropamide, and phenformin. Such supplementary active ingredients can be included in these compositions in amounts approximately equal to or less than the concentrations employed where each material are the sole active ingredients.

Starting compounds of structural formula I of this invention are disclosed in the art and can be prepared as shown in the art [e.g. J. Meinwald et al., J. Am. Chem. Soc. 85, 582–585 (1963)] and in the Preparations 1–6.

In carrying out the process of this invention, the selected exo-bicycloalkane carboxylic acid as chloride or possible as bromide is reacted in solution with an amine $H_2N-R_1$, wherein $R_1$ has the value given before. The amine is used in 0.5 times molar equivalents per mole of acid halide; however, larger or lesser amounts will still provide some diamide of formula II. The solvents used in this reaction are organic solvents, inert toward the reactants of this invention and liquid at the temperatures herein used i.e. at room temperatures (20°–30° C.). The reaction can be carried out between about 10° to 50° C.

Carbontetrachloride, chloroform, methylene chloride, benzene, toluene, ether, tetrahydrofuran, and the like can be used as solvents. If the amine above is ammonia, a partially aqueous solvent can be used.

The reaction time which varies with the reaction temperature, reagents, solvents, and the like, can be between one-half hour and 48 hours or more. At the termination of the reaction, the desired product is separated by conventional procedures, for example by extraction, chromatography, crystallization, distillation and the like.

The following Preparations and Examples are illustrative of the products of the present invention, but are not to be construed as limiting.

Preparation 1 Bicyclo[3.1.0.]hex-2-ene-6-endo-carboxaldehyde

To a rapidly stirred suspension of 392.0 g. (3.7 moles) of anhydrous sodium carbonate in a solution of 276.4 g. (3.0 moles) of bicyclo[2.2.1.]heptadiene in 1.7 l. methylene chloride was added 285 g. of 40 percent peracetic acid, which had been previously treated with 7.5 g. sodium acetate. The temperature was maintained at about 20° C. during the addition which required about 2 hours. The reaction mixture was stirred for an additional 2 ½ hours and allowed to stand overnight. The inorganic solids were filtered off and washed with methylene chloride. The methylene chloride (filtrate and wash) was distilled from the filtrate through a Vigreux column and the residual yellow oil (about 400 ml.) was used directly in the next step.

Preparation 2 Bicyclo[3.1.0.]hex-2-ene-6-endo-carboxylic acid

The acid was prepared by a slightly modified procedure. The crude bicyclo[3.1.0.]hex-2-ene-6-endo-carboxaldehyde from the previous step was mixed with 850 g. (5.0 moles) silver nitrate, 2 l. of water and 1 l. of 95 percent ethanol and stirred vigorously. A solution of 300 g. (7.5 moles) of sodium hydroxide in 4 l. of water was added over a period of 3 hours. The reaction is slightly exothermic. The mixture was allowed to stand overnight and the solids were filtered through Celite and washed with water. The filtrate was extracted with 3 × 1 l. of methylene chloride and the extracts were discarded. The aqueous phase was acidified with 280 ml. of concentrated hydrochloric acid and extracted with 6 × 1 l. methylene chloride. The extract was dried over anhydrous sodium sulfate and the solvent was removed under vacuum to give 148 g. of yellow crystals. Crystallization from about 800-ml. Skellysolve B hexanes and through (Darco)activated charcoal gave 131.7 g. of off-white crystals of bicyclo[3.1.0.]-hex-2-ene-6-endo-carboxylic acid of melting point 88°–91° C. Overall yield (from bicyclo[2.2.1.]heptadiene) was 71 percent.

Preparation 3 Bicyclo[3.1.0.]hexane-6-endo-carboxylic acid

Bicyclo[3.1.0.]-hex-2-ene-6-endo-carboxylic acid (131 g., 1.05 moles) was divided into 5 equal portions. Each was dissolved in 200 ml. absolute ether, 0.5 g. platinum oxide was added and the solutions were hydrogenated in a Parr Hydrogenator at an initial pressure of 50 lbs. until the hydrogen uptake ceased (6–8 minutes). The bottles were allowed to cool, the catalyst was filtered off and the combined filtrates were evaporated. The residue was crystallized from 350 ml. of Skellysolve B hexanes to yield 188 g. (89 percent) of white needles of bicyclo[3.1.0.]-hexane-6-endo-carboxylic acid in two crops of melting point 82°–85° C.

Preparation 4 Methyl Bicyclo[3.1.0.]hexane-6-endo-car-boxylate

Bicyclo[3.1.0.]hexane-6-endo-carboxylic acid (18.9 g., 0.15 mole) was added in small portion to an etheral solution of diazomethane. The reaction mixture was allowed to stand overnight and the excess diazomethane was destroyed by the addition of acetic acid. Half the ether was distilled and the concentrated solution was extracted twice with aqueous sodium bicarbonate followed by saturated salt solution. After drying the ether layer over magnesium sulfate, the solvent was distilled on the steam bath. Distillation of the residue under reduced pressure gave 19.8 g. (94 percent) of methyl bicyclo[3.1.0.]hexane-6-endocarboxylate as a colorless oil, of boiling point 71°–73° C.

Anal. calcd. for $C_8H_{12}O_2$:   C, 68.54; H, 8.63.
Found:   C, 68.36; H, 8.47.

Preparation 5 Exo-Bicyclo[3.1.0.]hexane-6-carboxylic acid

Methyl bicyclo[3.1.0.]hexane-6-endo-carboxylate (18.3 g.; 0.13 mole) was added to a solution of 9.0 g. (0.39 mole) of sodium in 250 ml. absolute ethanol and refluxed for 24 hours. The ethanol was distilled and the residue was washed twice with ether. The aqueous phase was acidified with concentrated hydrochloric acid and refrigerated. Yellow crystals separated and were filtered and washed with water. The crude product was dissolved in Skelly-solve B hexanes. The organic layer was separated from a small water layer and then treated with Darco activated charcoal. The resulting colorless solution was concentrated to circa 40 ml. and refrigerated to yield 12.4 g. (76 percent) of exo-bicyclo[3.1.0.]hexane-6-carboxylic acid in large colorless plates of melting point 59.5°–61.5° C.

Preparation 6 Exo-bicyclo[3.1.0.]hexane-6-acetic acid

Exo-bicyclo[3.1.0.]hexane-6-formyl chloride (5.8 g.; 0.040 moles) was added in small portions over a period of 10 minutes to the well stirred diazomethane solution maintained at 3° to 5° by means of an ice bath. After 30 minutes, stirring was discontinued and the reaction vessel was removed from the ice bath and allowed to warm to room temperature. An inverted recrystallizing dish was placed over the neck of the flask in order to minimize the loss of diazomethane through evaporation.

The reaction flask was allowed to stand undisturbed for three days in a well ventilated hood. It was then transferred to a beaker and the solution allowed to evaporate. The crude residue thus obtained was shown to contain the desired diazoketone by its infrared and nmr spectra. It was subjected to a Wolff rearrangement without purification.

The well stirred solution of the crude diazoketone in absolute methanol (300 ml.) at room temperature was treated with a fresly prepared solution of silver benzoate (3.0 g.) in triethylamine (30 ml.). Bubbles of gas were almost immediately emitted. When the bubbling subsided additional silver benzoate solution (1 g. of silver benzoate in 10 ml. of the triethylamine) was added. Stirring was continued for 1 hour and then the reaction mixture was allowed to stand for several days. It was then filtered through a pad of diatomaceous earth (Celite) and concentrated in vacuo to a viscous brown oil. This was dissolved in ether (400 ml.) and washed successively with water (2 × 250 ml.), 1 N hydrochloric acid (2 × 250 ml.) and finally with aqueous saturated sodium bicarbonate (2 × 400 ml.). The ether solution was dried over anhydrous magnesium sulfate. This was concentrated in vacuo to a red oil which, when subjected to vacuum distillation, gave 1.96 g. (32 percent overall yield) of methyl exo-bicyclo[3.1.0.]-hexane-6-acetate as pale green oil of boiling point 70° C. at 3.0 mm. Hg.

The above ester (1.96 g.; 0.013 moles) dissolved in ethanol (10 ml.) was combined with a 20 percent (w/v) potassium carbonate solution (40 ml.) and heated under gentle reflux with rapid stirring for 2 hours. After cooling to room temperature, the reaction mixture was diluted with water (200 ml.) and washed with ether (2 × 200 ml.). The aqueous layer was then acidified with 2.5 N sulfuric acid and the resultant suspended oil extracted with ether (2 × 150 ml.). The combined ether extracts were dried overnight over anhydrous magnesium sulfate. Concentration in vacuo gave a nearly colorless, clear oil (1.4 g.). Vacuum distillation of this oil gave 1.05 g. (58 percent yield) of exo-bicyclo[3.1.0.]hexane-6-acetic acid as a clear, colorless, noncrystallizable liquid, of boiling point 82° C. at 0.1 mm. Hg. The yield over all (from the acid chloride) was 18.5 percent.

Anal. calcd. for $C_8H_{12}O_2$:    C, 68.54; H, 8.63.
Found:    C, 68.25; H, 8.53.

These acids from the Preparations together with thionyl chloride and thionyl bromide are used to make, in conventional manner, the acid chlorides and acid bromides of formula I, used as starting materials.

Example 1 Exo-dibicyclo[3.1.0.]hexane-6-carboxamide

Aqueous ammonia (30 percent; 25 ml.) was added dropwise with stirring to exo-bicyclo[3.1.0.]hexane-6-formyl chloride (11.4 g.; 0.079 moles) dissolved in chloroform (100 ml.), maintained at 20°–25° C. by means of a water bath. After being stirred vigorously for two additional hours the solvent and excess ammonia were removed in vacuo and the residue was recrystallized to afford exo-dibicyclo[3.1.0.]hexane-6-carboxamide.

Example 2 Exo-dibicyclo[4.1.0.]heptane-7-carboxamide.

In the manner given in Example 1, aqueous ammonia was added to exo-bicyclo[4.1.0.]heptane-7-formyl chloride in chloroform at room temperature to give exo-dibicyclo-[4.1.0.]heptane-7-carboxamide.

Example 3 Exo-dibicyclo[5.1.0.]octane-8-carboxamide.

In the manner given in Example 1, aqueous ammonia was added to exo-bicyclo[5.1.0.]octane-8-formyl bromide in chloroform at room temperature to give exo-dibicyclo-[5.1.0.]octane-8-carboxamide.

Example 4 Exo-dibicyclo[3.1.0.]hexane-6-acetamide

In the manner given in Example 1, aqueous ammonia was added to exo-bicyclo[3.1.0.]hexane-6-acetyl chloride in chloroform at room temperature to give exo-dibicyclo-[3.1.0.]hexane-6-acetamide.

Example 5 Exo-dibicyclo[4.1.0.]heptane-7-acetamide

In the manner given in Example 1, aqueous ammonia was added to exo-bicyclo[4.1.0.]heptane-7-acetyl chloride in chloroform at room temperature to give exo-dibicyclo-[4.1.0.]heptane-7-acetamide.

Example 6 Exo-dibicyclo[5.1.0.]octane-8-acetamide

In the manner given in Example 1, aqueous ammonia was added to exo-bicyclo[5.1.0.]octane-8-acetyl bromide in chloroform at room temperature to give exo-dibicyclo-[5.1.0.]octane-8-acetamide.

Example 7 Exo-dibicyclo[3.1.0.]hexane-6-carbox-p-aniside

A solution of p-anisidine (0.039 moles) and 8.8 g. (0.16 moles) of triethylamine in 150 ml. of chloroform was added dropwise to exo-bicyclo[3.1.0.]hexane-6-formyl chloride (11.4 g., 0.079 moles) in 50 ml. of chloroform maintained at 20°–25 C. in a water-bath. The reaction mixture was evaporated to dryness and the pasty solid was agitated vigorously with 3N hydrochloric acid (150 ml.) for 15 min. It was then washed thoroughly with water, followed by 10 percent sodium bicarbonate. After a final washing with water the solid was partially dried in air and then dried overnight under vacuum at 35° in a slow stream of nitrogen. One recrystallization from chloroform containing a small amount of n-hexane gave exo-dibicyclo[3.1.0.]-hexane-6-carbox-p-aniside.

Example 8 Exo-dibicyclo[3.1.0.]hexane-6-carboxanilide

In the manner given in Example 7, aniline and triethylamine in chloroform at room temperature were added to exo-bicyclo[3.1.0.]hexane-6-formyl chloride in chloroform to give exo-dibicyclo[3.1.0.hexane-6-carboxanilide.

Example 9    Exo-dibicyclo[3.1.0.]heptane-7-carbox-m-(nitroanilide)

In the manner given in Example 1, m-nitroaniline was added at room temperature to exo-bicyclo[4.1.0.]heptane-7-formyl bromide in chloroform to give exo-dibicyclo-[4.1.0.]heptane-7-(carbox-m-nitroanilide).

Example 10    Exo-dibicyclo[5.1.0.]octane-7-carbox-m-toluidide.

In the manner given in Example 1, m-toluidine at room temperature was added to exo-bicyclo[5.1.0.]octane-7-formyl chloride in chloroform to give exo-bicyclo[5.1.0.]octane-7-carbox-m-toluidide.

Example 11 Exo-dibicyclo[3.1.0.]hexane-6-carbox-(o-chloro anilide)

In the manner given in Example 1, o-chloroaniline at room temperature was added to exo-bicyclo[3.1.0.]hexane-6-formyl bromide in chloroform to give exo-dibicyclo[3.1.0.]-hexane-6-carbox-(o-chloroanilide).

Example 12    Exo-dibicyclo[4.1.0.]heptane-7-carbox(m-trifluoromethylanilide)

In the manner given in Example 1, m-trifluoroaniline at room temperature was added to exo-bicyclo[3.1.0.]heptane-7-formyl bromide in chloroform to give exo-dibicyclo-[4.1.0.]heptane-7-carbox-(m-trifluoromethylanilde).

Example 13    Exo-dibicyclo[5.1.0.]octane-8-acet-(m-isopropoxyanilide)

In the manner given in Example 1, m-isopropoxyaniline at room temperature was added to exo-bicyclo[3.1.0.]octane-8-acetyl chloride in chloroform to give exo-dibicyclo-[5.1.0.]octane-8-acet-(m-isopropoxyanilide).

Example 14    Exo-dibicyclo[5.1.0.]octane-8-acet-(p-bromoanilide)

In the manner given in Example 1, p-bromoaniline at room temperature was added to exo-bicyclo[3.1.0.]octane-8-acetyl chloride in chloroform to give exo-dibicyclo-[5.1.0.]octane-8-acet-(p-bromoanilide).

Example 15 Exo-dibicyclo[3.1.0.]hexane-6-N-methylcarboxamide

In the manner given in Example 1, aqueous methyl ammonia was added at room temperature to exo-bicyclo[3.1.0.]-hexane-6-formyl chloride in chloroform to give exo-dibicyclo[3.1.0.hexane-6-N-methylcarboxamide.

Example 16 Exo-dibicyclo[4.1.0.]heptane-7-N-hexylacetamide

In the manner given in Example 1, monohexylamine at room temperature was added to exo-bicyclo[4.1.0.]heptane-7-acetyl chloride in chloroform to give exo-dibicyclo-[4.1.0.]heptane-7-N-hexylacetamide.

Example 17 Exo-dibicyclo[5.1.0.]octane-8-N-butylcarboxamide)

In the manner given in Example 1, aqueous butyl ammonia was added at room temperature to exo-bicyclo-[5.1.0.]oxtane-8-formyl bromide in chloroform to give exo-dibicyclo[5.1.0.octane-8-N-butylcarboxamide.

Example 18 N-(2-pyridyl)-exo-dibicyclo[3.1.0.]hexane-6-carboxamide.

2-Aminopyridine (82.0 g; 0.087 m) and triethylamine (17.6 g.; 0.174 m) in 100 ml. of chloroform was stirred well and added dropwise to exo-bicyclo[3.1.0.]hexane-6-formyl chloride (22.8 g.; 0.185 mole) in 50 ml. of chloroform.

There was obtained a yellow oil which crystallized on standing overnight at −15°. Recrystallization from n-hexane gave 1.1 g. of N-(2-pyridyl)-exo-bicyclo[3.1.0.]hexane-6-carboxamide as light tan needles of melting point 122-123.5° C. The filtrate was concentrated by one-half and chilled at −15° overnight to afford a second crop of crystals (0.2 g.). This was subjected to absorption chromatography on 50 g. of silica gel. The column was eluted with 300 ml. of 1:1 toluene-acetic acid. Fifteen fractions were collected. From fractions one to three there was obtained, after one recyrstallization from n-hexane, 0.3 g. of N-(2-pyridyl)-exo-bicyclo[3.1.0.]hexane-6-carboxa-mide of melting point 123°–124° C.

Fractions five to 15 gave 3.6 g. of N-(2-pyridyl)-exodibicyclo[3.1.0.]hexane-6-carboxamide which after recrystallization gave white needles of N-(2-pyridyl)-exo-dibicyclo[3.1.0.]hexane-6-carboxamide of melting point 149.5–141°C.

Anal. calcd. for $C_{19}H_{22}N_2O_7$: C, 73.53; H, 7.14; N, 9.03.

Found: C, 73.75; H, 7.30; N, 9.30.

Example 19 N-(2-pyridyl)-exo-dibicyclo[5.1.0.]octane-8-carboxamide

In the manner given in Example 18, 2-aminopyridine and triethylamine was added to exo-bicyclo[5.1.0.]-octane-8-formyl chloride to give N-(2-pyridyl)-exo-dibicyclo-[5.1.0.]octane-8-carboxamide which was recovered by chromatography as in Example 18.

Example 20 N-(2-pyridyl)-exo-dibicyclo[4.1.0.]heptane-7-carboxamide.

In the manner given in Example 18, 2-aminopyridine and triethylamine was added to exo-bicyclo[4.1.0.]heptane-8-formyl chloride to give N-(2-pyridyl)-exo-dibicyclo-[4.1.0.]heptane-8-carboxamide which was recovered by chrom-atography as in Example 18.

Example 21 N-(2-pyridyl)-exo-dibicyclo[4.1.0.]heptane-7-acetamide.

In the manner given in Example 18 2-aminopyridine and triethylamine was added to exo-bicyclo[4.1.0.]heptane-7-acetyl chloride to give N-(2-pyridyl)-exo-dibicyclo-[4.1.0.]heptane-7-acetamide which was recovered by chromatography as in Example 18.

Example 22 N-(2-pyridyl)exo-dibicyclo[5.1.0.]octane-8-acetamide

In the manner given in Example 18 2-aminopyridine and triethylamine was added to exo-bicyclo[5.1.0.]octane-8-acetyl chloride to give N-(2-pyridyl)-exo-dibicyclo-[5.1.0.]octane-8-acetamide which was recovered by chromatography as in Example 18.

In the manner given in the preceding Examples reacting an amino compound $H_2NR_1$ as defined above with a formyl or acetyl exo-bicycloalkane of formula I other exobicycloalkane acid amide of formula II are obtained. Representative compounds thus obtained, include:

Exo-dibicyclo[3.1.0.]hexane-6-(N-ethylcarboxamide);
Exo-dibicyclo[3.1.0.]hexane-6-(N-propylcarboxamide);
Exo-dibicyclo[3.1.0.]hexane-6-(N-isopropylcarboxamide);
Exo-dibicyclo[3.1.0.]hexane-6-(N-isobutylacetamide);
Exo-dibicyclo[3.1.0.]hexane-6-(N-pentylacetamide);
Exo-dibicyclo[3.1.0.]hexane-6-(N-isohexylacetamide);
Exo-dibicyclo[4.1.0.]heptane-7-(N-methylcarboxamide);
Exo-dibicyclo[4.1.0.]heptane-7-(N-methylacetamide);
Exo-dibicyclo[4.1.0.]heptane-7-(N-isobutylcarboxamide);
Exo-dibicyclo[4.1.0.]heptane-7-(N-isopentacetamide);
Exo-dibicyclo[4.1.0.]heptane-7-(N-hexylcarboxamide);
Exo-dibicyclo[5.1.0.]octane-8-(N-methylacetamide);
Exo-dibicyclo[5.1.0.]octane-8-(N-ethylcarboxamide);
Exo-dibicyclo[5.1.0.]octane-8-(N-hexaylacetamide);
Exo-dibicyclo[5.1.0.]octane-8-(N-pentylcarboxamide);
Exo-dibicyclo[3.1.0.]hexane-6-(carbox-o-iodanilide);
Exo-dibicyclo[3.1.0.]hexane-6-carbox-(p-trifluoromethylanilide);
Exo-dibicyclo[3.1.0.]hexane-6-carbox-(o-nitroanilide);
Exo-dibicyclo[4.1.0.]heptane-7-carboxanilide;
Exo-dibicyclo[4.1.0.]heptane-7-carbox-(m-propylanilide);
Exo-dibicyclo[5.1.0.]octane-8-carboxanilide;
Exo-dibicyclo[5.1.0.]octane-8-carbox-(m-trifluoromethylanilide);
Exo-dibicyclo[5.1.0.]octane-8-carbox(o-fluoroanilide);
Exo-dibicyclo[5.1.0.]octane-8-carbox(o-bromoanilide);
Exo-dibicyclo[5.1.0.]octane-8-carbox-(o-iodoanilide);
Exo-dibicyclo[3.1.0.]hexane-6-acet-(o-iodoanilide);
Exo-dibicyclo[3.1.0.]hexane-6-acet-(p-trifluoromethylanilide);
Exo-dibicyclo[3.1.0.]hexane-6-acet-(o-nitroanilide);
Exo-dibicyclo[4.1.0.]heptane-7-acetanilide;
Exo-dibicyclo[4.1.0.]heptane-7-acet-(m-propylanilide);
Exo-dibicyclo[5.1.0.]octane-8-acetanilide;
Exo-dibicyclo[5.1.0.]octan-8-acet(m-trifluoromethylanilide);
Exo-dibicyclo[5.1.0.]octane-8-acet(o-fluoroanilide);
Exo-dibicyclo[5.1.0.]octane-8-acet(o-bromoanilide);
Exo-dibicyclo[5.1.0.]octane-8-acet(o-iodoanilide);
N-(2-pyridyl)-exo-dibicyclo[3.1.0.]hexane-6-acetamide;
and the like.

I claim:
1. An exo-dibicycloalkane amide of the formula:

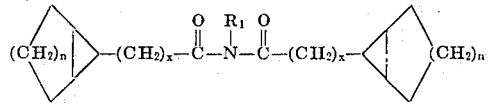

wherein $n$ has the value of 1 to 3, inclusive; wherein $x$ is zero or 1; wherein $R_1$ is selected from the group consisting of hydrogen, alkyl of one to six carbon atoms, inclusive, 2-pyridyl, phenyl and substituted phenyl in which the substituent is alkyl of one to three carbon atoms, inclusive, alkoxy of one to three carbon atoms, inclusive, halogen, nitro or trifluoromethyl.

2. A compound according to claim 1 wherein $n$ is 1, $x$ is zero, and $R_1$ is hydrogen, so that the compounds is exo-dibicyclo[3.1.0.hexane-6-carboxamide.

3. A compound according to claim 1, wherein $n$ is 1; $x$ is zero, $R_1$ is p-methoxyphenyl, so that the compound is exo-dibicyclo[3.1.0.hexane-6-carbox-p-aniside.

4. A compound according to claim 1, wherein $n$ is 1; $x$ is zero, $R_1$ is 2-pyridyl, so that the compound is N-(2-pyridyl)-exo-dibicyclo[3.1.0.]hexane-6-carboxamide.

* * * * *